E. Ball Jr.
Axle for Vehicles
No. 121,574.                                Patented Dec. 5, 1871.
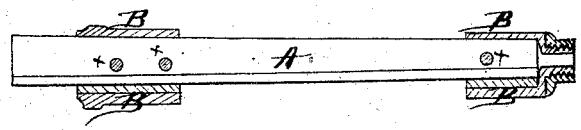
Fig. 1.
  
Fig. 2.      Fig. 3.
Witnesses.                                   Inventor.
Jas. E. Hutchinson                           E. Ball Jr.
                                             per
                                             Alexander Mason
                                             Atty.

UNITED STATES PATENT OFFICE.

EPHRAIM BALL, JR., OF CANTON, OHIO.

IMPROVEMENT IN AXLES FOR VEHICLES.

Specification forming part of Letters Patent No. 121,574, dated December 5, 1871; antedated November 25, 1871.

*To all whom it may concern:*

Be it known that I, EPHRAIM BALL, Jr., of Canton, in the county of Stark and in the State of Ohio, have invented certain new and useful Improvements in Axles for Vehicles; and do hereby declare that the following is a full, clear, and exact description thereof, reference being had to the accompanying drawing and to the letters of reference marked thereon making a part of this specification.

The nature of my invention consists in filling or rounding up uneven-shaped iron, the ends of axle-trees designed for the spindle, and forming true bearing by two half bearings, whose insides are shaped to fit the iron used, and also the fastening them to the axle by two or more bolts or rivets, which halves, when thus bolted or riveted to the axle, form a true bearing or spindle.

In order to enable others skilled in the art to which my invention appertains to make and use the same, I will now proceed to describe its construction and operation, referring to the annexed drawing, in which—

Figure 1 is a side view of the axle, showing the bearings in longitudinal vertical section. Fig. 2 is a transverse vertical section, and Fig. 3 is an end view.

A represents an axle made of T or any other uneven shape, upon which are placed two half bearings, B B. The insides of these bearings or half bearings are made so as to fit the uneven surface of the axle and when put together form a true bearing or spindle. These half bearings may extend the entire length of the spindle wanted, or form a bearing at each end, as shown in Fig. 1. They are fastened to the axle by rivets or bolts.

Having thus fully described my invention, what I claim as new, and desire to secure by Letters Patent, is—

The combination of a T or angular-shaped axle, A, and the bisected bearings B B having their under sides shaped to fit said axle, and connected together and to the axle by bolts or rivets $x$ $x$, substantially as herein set forth.

In testimony that I claim the foregoing I have hereunto set my hand this 17th day of April, 1870.

E. BALL, JR.

Witnesses:
W. W. CLARK,
C. L. EVERT. (31)